No. 768,738. PATENTED AUG. 30, 1904.
G. S. DUNN.
MOTOR GENERATOR.
APPLICATION FILED APR. 22, 1904.
NO MODEL.
Fig.1,
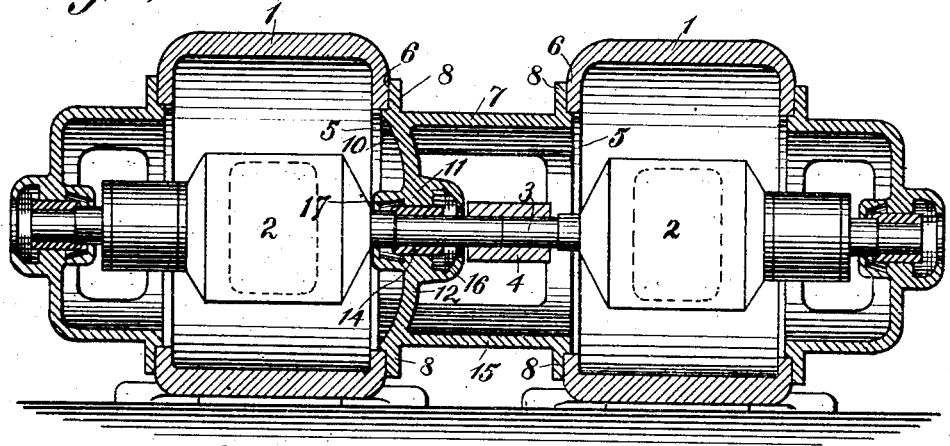
Fig.2,
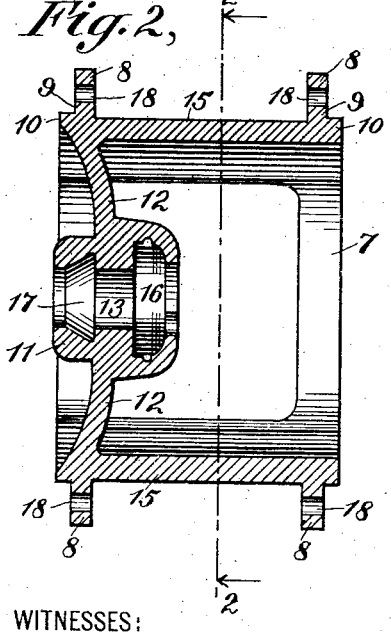
Fig.3,
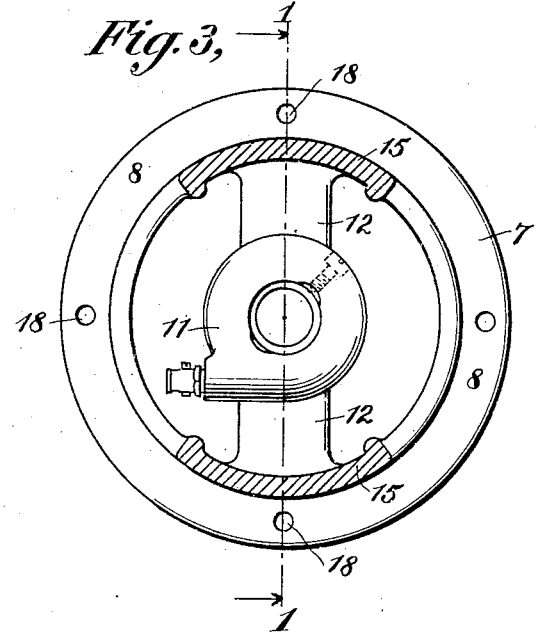
WITNESSES:
Benj. E. Teale
INVENTOR
Geo. S. Dunn,
BY
Chas. D. Earll
ATTORNEY No. 768,738.

Patented August 30, 1904.

UNITED STATES PATENT OFFICE.

GANO S. DUNN, OF NEW YORK, N. Y.

MOTOR-GENERATOR.

SPECIFICATION forming part of Letters Patent No. 768,738, dated August 30, 1904.

Application filed April 22, 1904. Serial No. 204,328. (No model.)

*To all whom it may concern:*

Be it known that I, GANO S. DUNN, a citizen of the United States of America, and a resident of the city, county, and State of New York, have invented certain new and useful Improvements in Motor-Generators, of which the following is a specification.

My invention relates to motor-generators, and has for its object to provide a motor-generator frame which shall be simple in its construction and effective in maintaining the operative parts of the motor-generator in position and which may be used to connect the magnet-frames of standard motors or generators when it is desired to operate two or more machines together as a motor-generator.

My invention consists in joining two oppositely-disposed flanges having a centrally-located bearing secured, preferably, near the plane of one of the flanges and in other novel features of construction to be hereinafter more fully pointed out and described.

As is well known, a motor-generator consists of an electric motor and an electric generator having their armatures mechanically connected. The armatures of the two elements composing the motor-generator usually have their axes coincident and are joined by a coupling. Heretofore it has been the practice, however, to mount the magnet-frames of such machines upon a bed-plate which is heavy and expensive, and great care is required in securing the motor and generator to said bed-plate to insure the proper alinement of the two armatures.

Where my motor-generator coupling is used no bed-plate is required, and the mere act of securing the magnet-frames to the coupling insures the accurate alinement of the armatures. Furthermore, the two end plates, which the coupling displaces being dispensed with a considerable saving in expense results.

In the drawings accompanying and forming part of this specification, Figure 1 is a central longitudinal section through a motor-generator supplied with my coupling. Fig. 2 is a detailed central section through the coupling on line 1 1 of Fig. 3, and Fig. 3 is a section on line 2 2 of Fig. 2.

The reference characters are used in the same sense in all of the figures and the specification.

Numeral 1 represents the frames of the generator and motor of the motor-generator.

2 represents the armatures.

3 represents the armature-shafts, which are joined by the coupling 4.

5 represents cylindrical recesses accurately bored in the magnet-frames concentric with the axis of the armature-shafts.

6 represents plane faces normal to the axis of the armature-shafts, which surround the cylindrical recesses 5.

7 represents a coupling member adapted to join the two magnet-frames.

8 represents annular flanges of the coupling member, having the plane faces or seats 9 adapted to bear upon the faces 6 of the magnet-frames, and 10 represents cylindrical projections on the coupling adapted to fit within the cylindrical recesses 5 of the magnet-frames.

11 represents a bearing-hub rigidly secured by means of the arms 12 to one of the flanges 8, the hub 11 being provided with a central bore 13 adapted to receive the bush 14.

15 represents longitudinal struts or members which are rigidly secured to the flanges 8. The flanges 8, the struts 15, and the hub 13, with the connecting-arms 12, are preferably cast integrally in one piece.

16 and 17 represent chambers on either side of the central bore for the purpose of forming oil-receptacles.

The flanges 8 are secured to the magnet-frames 1 by means of cap-screws which pass through the holes 18. The bearing-seats 9, the cylindrical projections 10, and the central bore 13 of the coupling are all machined or finished accurately concentric with each other, and as the recesses 5 in the magnet-frames are also accurately finished concentric with the axis of the armature-shafts it is obvious that when the coupling is securely held in position on its seats in the magnet-frames it will hold the magnet-frames rigidly in accurate alinement, inasmuch as the magnet-frames 1 may be identically the same as magnet-frames used for motors or generators, the recesses 5 when thus employed being for the purpose of securing the bearing-plates in position.

It is obvious that a motor-generator may be formed by using the motor-frames, armatures, commutators, and, in fact, all the parts of the motors or generators, as the case may be, of standard machines by simply replacing the usual end bearing-plates with my improved coupling. The expense of the bearing-plates is thus saved, and a reliable and rigid means is provided for holding the two motor-frames in position and for supporting the bushing which forms the armature-bearing upon the two motor-frames.

Having thus described my invention, what I claim is—

1. In a motor-generator, the combination with two magnet-frames, of a coupling member adapted to be secured to said magnet-frames and a journal-bearing in said coupling member concentric with said magnet-frames.

2. In a motor-generator coupling, the combination with two magnet-frames provided with annular seats and cylindrical recesses concentric with the motor-axis, of a coupling having two oppositely-disposed annular seats and concentric cylindrical projections adapted to fit, respectively, the annular seats and cylindrical recesses in said frames and means for securing said frames to said coupling.

3. In a motor-generator, the combination with two magnet-frames having seats normal and a cylindrical recess concentric with the armature-axis of a coupling having oppositely-disposed seats adapted to engage the magnet-frame seats and cylindrical projections adapted to fit the cylindrical recess in said magnet-frame and a journal-bearing in said coupling member concentric with the armature-axis.

4. In a motor-generator, the combination with a pair of magnet-frames provided at their ends with annular seats and cylindrical recesses concentric with the armature-axis, of a coupling having two oppositely-disposed annular flanges and cylindrical projections adapted to fit, respectively, the annular seats and cylindrical recesses in said motor-frames, rigid connections between said flanges and a journal-bearing connected with one of said flanges concentric with said cylindrical projections and the armature-axis.

5. In a motor-generator, the combination with a pair of magnet-frames each provided with an annular seat and a cylindrical recess on its end adapted to receive end journal-bearing plates on said magnet-frames for carrying the armature journal-bearing when said magnet-frames are used independently and a coupling provided with two oppositely-disposed concentric bearing-flanges interchangeable with said bearing-plates whereby said bearing-plates may be removed and said magnet-frames secured to said coupling member.

6. In a motor-generator, the combination with a plurality of magnet-frames provided with end seats, of a coupling member having seats adapted to fit the end seats on said magnet-frames, and means for securing said coupling member to said magnet-frames.

7. In a motor-generator, the combination with magnet-frames having transverse seats normal to the armature-axis, of a coupling member having seats engaging said magnet-frame seats, and means for securing said coupling member to said magnet-frames.

8. In a motor-generator, the combination with magnet-frames having annular seats concentric with the armature-axis, of a coupling member having seats to engage said annular seats and means for securing said coupling member to said magnet-frames.

9. In a motor-generator, the combination with a plurality of magnet-frames, of connections between said frames arranged around the armature-axis to hold said frames in alinement.

10. In a dynamo-electric machine, the combination with a magnet-frame having an end seat, of a coupling member having a seat adapted to fit said end seat and means for securing said coupling member to said magnet-frame.

In testimony whereof I have signed my name to this specification in the presence of two subscribing witnesses.

GANO S. DUNN.

Witnesses:
M. E. SAMMIS,
F. DARLINGTON.